Sept. 23, 1958   W. W. BALLARD ET AL   2,852,841
METHODS FOR MAKING HOSE COUPLINGS
Original Filed Feb. 23, 1954                               2 Sheets-Sheet 1
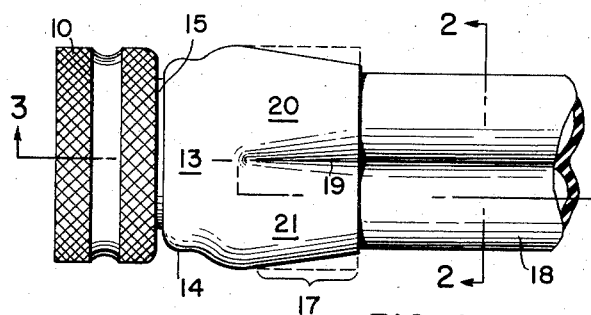
FIG. 1
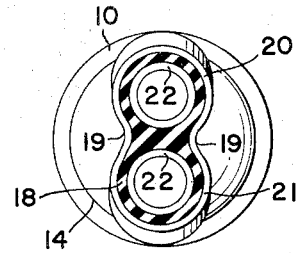
FIG. 2
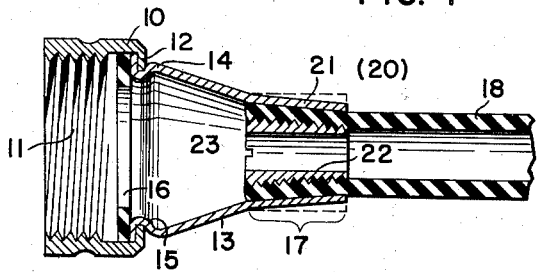
FIG. 3
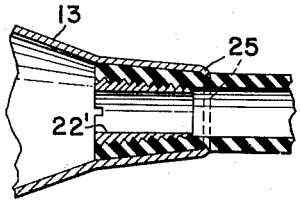
FIG. 5.
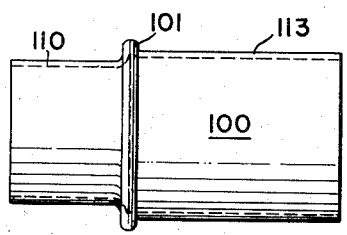
FIG. 6
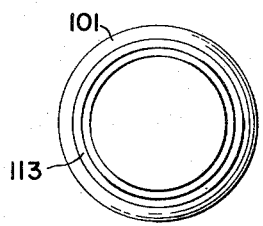
FIG. 6ª
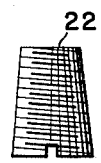
FIG. 4.
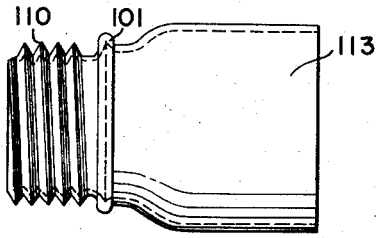
FIG. 7
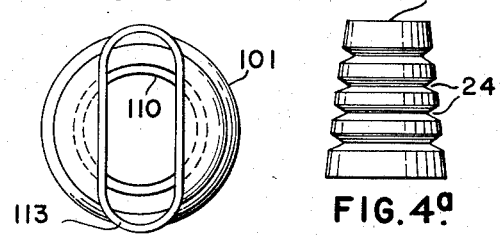
FIG. 7ª     FIG. 4ª
INVENTORS
WALTER W. BALLARD
LEWEN R. NELSON
BY Stone, Boyden + Mack,
ATTORNEYS Sept. 23, 1958 W. W. BALLARD ET AL 2,852,841
METHODS FOR MAKING HOSE COUPLINGS
Original Filed Feb. 23, 1954 2 Sheets-Sheet 2
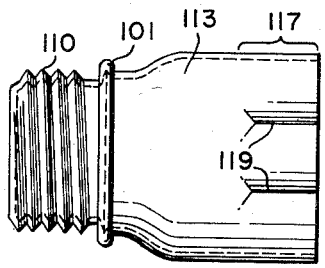
FIG. 8
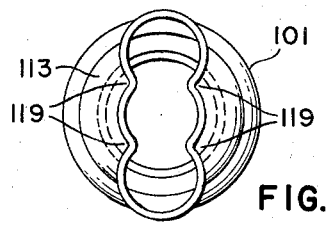
FIG. 8ª
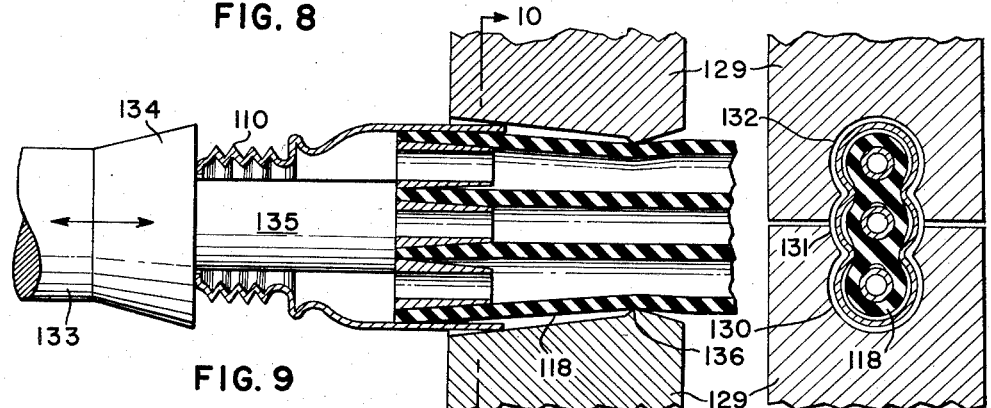
FIG. 9 FIG. 10
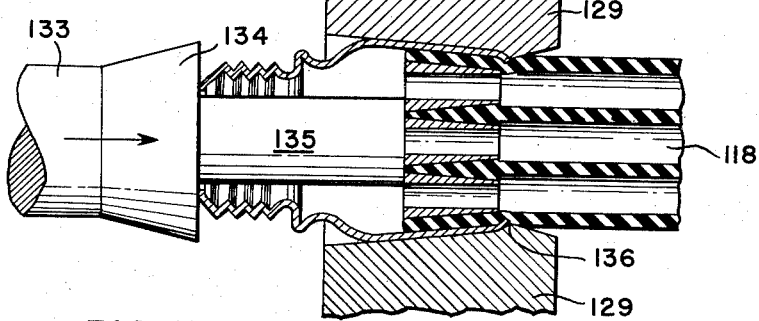
FIG. 11
INVENTORS
WALTER W. BALLARD
LEWEN R. NELSON
BY Stone, Boyden + Mack,
ATTORNEYS

United States Patent Office 2,852,841
Patented Sept. 23, 1958

2,852,841

METHODS FOR MAKING HOSE COUPLINGS

Walter W. Ballard and Lewen R. Nelson, Peoria, Ill.

Original application February 23, 1954, Serial No. 411,923, now Patent No. 2,798,745, dated July 9, 1957. Divided and this application June 7, 1955, Serial No. 513,802

4 Claims. (Cl. 29—508)

This invention relates to hose couplings and particularly to methods for producing multiple tube hose couplings of the type described and claimed in application Serial Number 411,923, filed February 23, 1954, 2,798,-745, issued July 9, 1957, of which the present application is a division.

The invention is particularly directed to couplings associated with a hose assembly comprising a plurality of tubular conduits arranged side-by-side, so that the hose assembly has a generally oblong cross-section. The tubular conduits may be independent of one another except as joined by the coupling, or they may be joined in parallel side-by-side relation to form an integral unit of the general type typified by the disclosure of United States Patent 2,621,075, issued December 9, 1952, to W. Sedar.

Such hoses are usually manufactured from rubber, synthetic rubber, or synthetic resinous materials by extrusion or like methods so that the material of the hose is compressible. As disclosed in the patent above referred to, multiple tube hoses are usually provided with spaced radially extending apertures and find extensive use for irrigation without involving additional spraying elements.

The method of the invention provides a novel form of connector for hose assemblies of this type which allows the multiple tube hose assembly to be connected to a conventional silcock or other threaded device of circular cross-section. Thus, the couplings produced by the present invention provide a transition between the circular cross-section of the usual supply pipe and the generally oblong cross-section of the multiple tube hose assembly. A particular advantage of the invention is the provision of a particularly effective method for forming coupling structures of the type referred to which clamp the conduit ends of the hose assembly under compression in such manner that the compressible material thereof is securely held against displacement when the hose assembly and coupling are in use. In order that the invention may be understood in detail, reference is had to the accompanying drawings which form a part of this specification and wherein:

Fig. 1 is an elevational view of a typical coupling structure which may be produced by the method of the present invention;

Fig. 2 is a transverse sectional view taken on the line 2—2, Fig. 1;

Fig. 3 is a longitudinal sectional view taken on the line 3—3, Fig. 1;

Figs. 4 and 4ª are elevational views of typical inserts employed in the construction shown in Fig. 1;

Fig. 5 is a fragmentary longitudinal sectional view, similar to Fig. 3, showing a modified construction which may be produced by the present method.

Figs. 6–8ª illustrate sequential steps employed in the present method for producing coupling ferrules, and Figs. 9–11 illustrate the manner in which such ferrules are shaped to final form in production of a completed coupling in accordance with the invention.

Referring now to the drawings in detail, Figs. 1–3 illustrate a typical hose coupling which may be produced by the present method. This coupling comprises a conventional circular coupling nut 10 which is interiorly threaded at 11 and provided at one end with an inturned flange 12. A ferrule 13 is employed, this ferrule including a base portion 14 of circular cross-section joined to the coupling nut 10 by means of an annular inwardly directed groove 15 providing an end flange engaged behind the flange 12 of the coupling nut. The usual compressible sealing washer 16 is provided within the coupling nut 12 to engage the end flange of the ferrule.

While the cross-section of the ferrule 13 is circular at the base of the ferrule, the tip or free end 17 of the ferrule is of generally oblong cross-section, corresponding to the shape of the hose. The tip portion 17 extends for a material part of the length of the ferrule 13 and is provided with two diametrically opposed longitudinally extending indentations or depressions 19 dividing the tip portion 17 into two parallel sections 20 and 21 of generally circular cross-section.

The hose 18 comprises two tubes of circular cross-section joined side-by-side, each tube having its end situated in a different one of the sections 20 and 21 of the tip portion 17 of the ferrule. As best seen in Fig. 3, there is positioned in the end of each tube of the hose 18 a rigid, tubular, tapered insert 22, the inserts being situated with their smaller ends inwardly of the hose. The inserts 22 have an outer diameter somewhat greater than the normal inner diameter of the tubes of the hose 18, the inserts being exteriorly threaded and arranged with their threads embedded in the compressible material of the hose. It will be noted that the tip portion 17 of the ferrule 13 tapers from a larger cross-section in the body of the ferrule to a smaller cross-section at the free end of the ferrule. Similarly, the diametrically opposed longitudinally extending depressions 19 are deeper at the free end of the ferrule than they are in the body of the ferrule, so that the sections 20 and 21 are of tapered shape conforming to the shape of the inserts 22. The parallel sections 20 and 21 of the ferrule and the tapered inserts 22 thus provide opposed clamping surfaces between which the material of the hose is secured under compression. The inserts 22 are preferably provided with slots 23 to be engaged by a screwdriver or like tool for removal of the inserts, in order that the couplings may be removed from the hose by the purchaser if desired.

While the embodiment of the invention shown in Figs. 1–3 employs a ferrule and a coupling nut initially formed as separate units and later joined together, the invention is equally adaptable to construction, as in Figs. 7–8ª, wherein the threaded coupling member 110, a male coupling in this instance, and the ferrule 113 are fabricated from a single tubular sheet metal work-piece. In both cases, the ferrule portion tapers from a base portion of the circular cross-section to a tip portion of generally oblong cross-section.

In general, coupling structures are produced in accordance with the method of the invention by providing a cylindrical ferrule piece, preliminarily flattening one end portion of the ferrule piece to form a tip portion of generally oblong cross-section, which flattened portion extends for a material part of the length of the ferrule piece, and finally forming the tip portion into a plurality of parallel longitudinally extending generally frusto-conical sections each adapted to embrace the end of one tubular conduit of the hose assembly.

Thus, in producing a one-piece unit of the type seen in Figs. 6–8ª, one may start with a tubular work piece 100, Fig. 6, including a coupling portion 110, of smaller diameter, and a ferrule portion 113 of larger diameter. Such a work piece may be produced by forming a cup-shaped sheet metal blank, or by reducing in a die one end of a cylindrical tubular blank.

The work piece is then upset to provide an outwardly directly transverse annular flange 101 situated between the coupling portion and the ferrule portion and constituting the sole means for joining said portions one to the other. Threads are then rolled on the coupling portion 110 as seen in Fig. 7, in this instance providing a male coupler for engagement with a coupling nut such as the nut 10, Fig. 3.

The free end of the ferrule portion 113 is then preliminarily flattened to provide a tip portion 117 of generally oblong cross-section, as seen in Figs. 7 and 7ᵃ, such tip portion extending for a major part of the length of the ferrule. This preliminarily flattened tip portion is then secured to the end of the hose assembly as will be described with reference to Figs. 9–11.

Instead of preliminarily flattening the free end of the ferrule portion 113 to the simple oblong cross-section seen in Figs. 7 and 7ᵃ, the preliminary flattening step may provide a plurality of longitudinally extending depressions 119 arranged in diametrically opposed pairs as seen in Figs. 8 and 8ᵃ. The depressions 119 divide the tip of the ferrule portion into a plurality of parallel sections of partially circular cross-section to receive the ends of the conduits of the hose assembly preparatory to final shaping of the sections into clamping relation with the hose in which the sections approach more closely a completely circular cross-section to apply radial pressure to the hose material substantially uniformly around the cylindrical inserts. At this stage, the major surfaces of the tip portion of the ferrule have a regular hill-and-valley configuration as seen in Fig. 8ᵃ for a 3-tube hose, and in Fig. 1, for a 2-tube hose. In each case, the parallel sections of the ferrule tip portion are generally cylindrical and substantially untapered, as is readily apparent in Fig. 8 and from the dotted lines in Fig. 1. It is preferred that the preliminary flattened tip portion be of such dimension that the end of the hose to which the coupling is to be attached will fit snugly therein, with the end of each tube of the hose situated in a different one of said parallel sections.

It will be obvious that the female coupling of Figs. 1–3 may be produced by the method just outlined, the only variation required being the formation of groove 15, Fig. 3, to secure the coupling nut 10, rather than forming the flange 101 and the male coupling portion 110, Figs. 6–8. The final shaping operation performed on the ferrule tip portion 17 and 117 may be the same, regardless of whether or not the coupling portion is made from the same work piece as the ferrule portion.

The preliminarily shaped ferrule is now fixed to the hose end in accordance with the method illustrated in Figs. 9–11. The rigid, tapered, tubular inserts, which may be of the type seen in Fig. 4 or Fig. 4ᵃ, are inserted small end inwardly each in a different one of the tubes of the hose 118. The end of the hose containing the inserts is then positioned within the free end portion of the preliminarily flattened ferrule.

The loose assembly is then positioned in a stationary split die 129 having tapered concavities 130, 131 and 132 corresponding in shape to the tapered inserts in the hose end. Since at the start of this operation the ferrule tip portion is still untapered, the tip of the ferrule can enter only part way into the die cavity before engaging the tapered surfaces thereof, as clearly seen in Fig. 9.

To effect relative movement between the die and the ferrule, there is employed a push-rod 133 having a shoulder 134 in contact with the coupling portion of the assembly, in this instance the end of the threaded portion 110. Such push-rod is also provided with a tip 135 engaging the hose end and the inserts therein, so that the longitudinal spacing of the hose end, with inserts, and the ferrule is fixed. As indicated in Fig. 9, the hose end is preferably held sufficiently far within the ferrule that the smaller ends of the inserts are spaced inwardly somewhat relative to the free end of the ferrule. The push-rod 133 is now moved toward the die 129, forcing the tip portion of the ferrule fully into the die cavity, so that the parallel sections of the ferrule tip portion are drawn to the same shapes as the inserts and the hose end is securely clamped between the ferrule wall and the inserts, this action being illustrated by Fig. 11. The split die 129 is then opened and the completed assembly removed therefrom.

The working cavity of the die 129 is preferably terminated by an abrupt ridge 136 to shape the extreme tip edge of the ferrule into the inturned flange 25, Fig. 5.

It will be understood that, when the die 129 is completely closed and the coupling assembly has been forced fully into the die, as seen in Fig. 11, the cross-sectional area of the space between the inserts and the walls of the die cavity is smaller than the combined cross-section of the hose walls and ferrule, so that these cannot be accommodated without a marked compression of the material of the hose against the support afforded by the rigid inserts. Accordingly, forcing the coupling assembly fully into the die cavity results in simultaneous shaping of the ferrule to final form and compression of the hose material to produce a sealed joint.

Referring particularly to Fig. 10, it will be seen that the hose 118 is so constructed that there is an excess of compressible material, between adjacent tubes, in the sense that the mass of material between the tubes is markedly thicker than the normal walls of the hose. It has been found that the presence of this excess of compressible material aids very materially the clamping action resulting when the hose assembly is forced fully within the die 129. The tip or deeper portions of the longitudinal depressions formed in the ferrule by contact with the die project deep into this relatively thicker mass of hose material, causing considerable "flow" of the excess material during the clamping action, that is, during the final shaping of the ferrule as illustrated in Fig. 11.

For purposes of simplicity, the method steps of Figs. 9–11 have been illustrated and described with reference to an integral multiple tube hose assembly. The method is also applicable to hose assemblies including a plurality of separate tubular conduits held in assembled relation by the coupling. Thus, the method of the present invention is particularly well adapted to production of sprinkler assemblies of the type described and claimed in copending application Serial Number 419,687, filed March 30, 1954, by Lewen R. Nelson.

We claim:

1. A method for coupling a hose assembly fabricated from compressible material and comprising a plurality of tubular conduits arranged side-by-side to a coupling member having a single fluid-conducting bore, comprising the steps of providing a generally cylindrical sheet metal member, forming one end of said sheet metal member for connection to a coupling member of circular cross-section, preliminarily flattening the other end portion of said sheet metal member to provide a ferrule portion of generally oblong cross-section of such size as will embrace an end of such hose assembly, inserting a rigid, tapered, tubular insert in the end of each conduit of the hose assembly with the smaller ends of the inserts inwardly of the conduit, positioning the end of the hose assembly containing said inserts within said ferrule portion, providing a tapered die cavity in the form of a plurality of generally parallel sections each conforming to the shape of one of said inserts, placing said ferrule portion, with the end of the hose disposed therein, in said die cavity with said inserts and said die cavity sections tapering in the same direction, and forcing said ferrule portion into said die cavity, while restricting relative longitudinal movement between said ferrule portion and said conduit ends, until said ferrule portion is finally shaped to conform to the shape of said insert and the hose assembly is clamped between said ferrule portion and said inserts.

2. A method for manufacturing a combined multiple-tube hose and coupling unit for coupling such hose to a coupling member having a single fluid-conducting bore, comprising the steps of providing a generally cylindrical sheet metal member having one end portion of smaller diameter and the other end portion of larger diameter, threading said end portion of smaller diameter for engagement with a threaded coupling member of circular cross-section, preliminarily flattening said end portion of larger diameter to provide a ferrule portion of generally oblong cross-section of such size as will embrace an end of the multiple-tube hose assembly, inserting a rigid, tapered, tubular insert in the end of each conduit of the hose assembly with the smaller ends of the inserts inwardly of the conduit, positioning the end of the hose assembly containing said inserts within said ferrule portion, providing a tapered die cavity in the form of a plurality of generally parallel sections each conforming to the shape of one of said inserts, placing said ferrule portion, with the end of the hose disposed therein, in said die cavity with said inserts and said die cavity sections tapering in the same direction, and forcing said ferrule portion into said die cavity, while restricting relative longitudinal movement between said ferrule portion and said conduit ends, until said ferrule portion is finally shaped to conform to the shape of said insert and the hose assembly is clamped between said ferrule portion and said inserts.

3. A method for manufacturing a combined multiple-tube hose and coupling unit for coupling such hose to a coupling member having a single fluid-conducting bore, comprising providing an integral multiple-tube hose assembly fabricated from compressible material and comprising a plurality of parallel tubular conduits joined together in side-by-side relation by elongated masses of hose material material thicker than the walls of said tube, providing a generally cylindrical sheet metal member, forming one end of said sheet metal member for connection to a coupling member of circular cross-section, preliminarily flattening the other end portion of said sheet metal member to provide a ferrule portion of generally oblong cross-section of such size as will embrace an end of said hose assembly, inserting a rigid, tapered tubular insert in the end of each tube of the hose assembly with the smaller ends of the inserts inwardly of the hose, positioning the end of the hose assembly containing said inserts within said ferrule portion, providing a tapered die cavity in the form of a plurality of generally parallel sections each conforming to the shape of one of said inserts, adjacent one of said generally parallel sections joining each other in an inwardly directed ridge, placing said ferrule portion, with the end of the hose disposed therein, in said die cavity with said inserts and said die cavity sections tapering in the same direction, and effecting relative axial movement between said die cavity said ferrule portion, while restricting relative axial movement between said ferrule portion and said tube ends, to force said ferrule portion into said die cavity and finally shape said ferrule portion to conform to said inserts, such relative longitudinal movement being continued until the cross-sectional area between said inserts and said die cavity is smaller than the cross-sectional area of the hose, whereby the end of the hose is clamped in fluid-tight relation between said inserts and said ferrule portion with parallel-longitudinally extending areas of said ferrule portion being embedded in said masses of hose material between said inserts.

4. A method for coupling a hose assembly fabricated from compressible material and comprising a plurality of tubular conduits arranged side-by-side to a coupling member having a single fluid-conducting bore, comprising the steps of providing a generally cylindrical sheet metal member, forming one end of said sheet metal member for connection to a coupling member of circular cross-section, preliminarily flattening the other end portion of said sheet metal member to provide a ferrule portion of generally oblong cross-section of such size as will embrace an end of such hose assembly, inserting a rigid, tapered, tubular insert in the end of each conduit of the hose assembly with the smaller ends of the inserts inwardly of the conduit, positioning the end of the hose assembly containing said inserts within said ferrule portion, providing a tapered die cavity in the form of a plurality of generally parallel sections each conforming to the shape of one of said inserts, placing said ferrule portion, with the end of the hose disposed therein, in said die cavity with said inserts and said die cavity sections tapering in the same direction, and forcing said ferrule portion into said die cavity, while restricting relative longitudinal movement between said ferrule portion and said conduit ends, until said ferrule portion is finally shaped to conform to the shape of said insert and the hose assembly is clamped between said ferrule portion and said inserts, said restricting of movement between said ferrule portion and said conduit ends being accomplished by exercising thrust against the outer end of said ferrule portion while concurrently exercising thrust against each of said tubular inserts.

References Cited in the file of this patent

UNITED STATES PATENTS

| | | |
|---|---|---|
| 1,830,229 | Gray | Nov. 3, 1931 |
| 2,158,538 | Gish | May 16, 1939 |
| 2,333,349 | Weatherhead | Nov. 2, 1943 |
| 2,430,921 | Edelmann | Nov. 18, 1947 |
| 2,739,842 | Andrews | Mar. 27, 1956 |

UNITED STATES PATENT OFFICE
CERTIFICATE OF CORRECTION

Patent No. 2,852,841

September 23, 1958

Walter W. Ballard et al.

It is hereby certified that error appears in the printed specification of the above numbered patent requiring correction and that the said Letters Patent should read as corrected below.

Column 5, line 40, for "material", second occurrence, read -- materially --; column 6, line 4, after "cavity" insert -- and --.

Signed and sealed this 9th day of December 1958.

(SEAL)
Attest:

KARL H. AXLINE
Attesting Officer

ROBERT C. WATSON
Commissioner of Patents